(12) United States Patent
Harashima et al.

(10) Patent No.: US 8,108,059 B2
(45) Date of Patent: Jan. 31, 2012

(54) METHOD OF DETERMINING RANGE OF CHANGE IN DESIGN, DESIGN CHANGE RANGE DETERMINING APPARATUS, AND DESIGN CHANGE RANGE DETERMINING SYSTEM

(75) Inventors: Ichiro Harashima, Ibaraki (JP); Keisuke Nakashima, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 297 days.

(21) Appl. No.: 11/848,310

(22) Filed: Aug. 31, 2007

(65) Prior Publication Data
US 2008/0077902 A1    Mar. 27, 2008

(30) Foreign Application Priority Data
Sep. 26, 2006    (JP) .................................. 2006-260656

(51) Int. Cl.
G06F 19/00    (2011.01)

(52) U.S. Cl. .............................. 700/105; 700/107; 703/1

(58) Field of Classification Search .................... 700/95, 700/97, 98, 105, 107, 182; 703/1, 6, 13; 716/8, 11; 707/1, 100, 102, 103 R, 104.1
See application file for complete search history.

(56) References Cited

U.S. PATENT DOCUMENTS

| | | | | |
|---|---|---|---|---|
| 5,734,899 | A * | 3/1998 | Yoshizawa et al. | 707/203 |
| 6,088,625 | A * | 7/2000 | Kellstrom, Jr. | 700/97 |
| 7,580,909 | B2 * | 8/2009 | Bollacker et al. | 706/46 |
| 2002/0010711 | A1 * | 1/2002 | Nakanishi et al. | 707/501.1 |
| 2003/0114947 | A1 * | 6/2003 | Tanaguchi | 700/98 |
| 2003/0204527 | A1 * | 10/2003 | Callahan | 707/104.1 |
| 2005/0049986 | A1 * | 3/2005 | Bollacker et al. | 706/46 |
| 2005/0071135 | A1 * | 3/2005 | Vredenburgh et al. | 703/1 |
| 2005/0229136 | A1 * | 10/2005 | Yuda et al. | 716/11 |
| 2005/0251274 | A1 * | 11/2005 | Bigelow | 700/97 |

FOREIGN PATENT DOCUMENTS

| | | |
|---|---|---|
| JP | 05-012354 | 1/1993 |
| JP | 08-069480 | 3/1996 |
| JP | 09-223148 | 8/1997 |
| JP | 2000-172728 | 6/2000 |

OTHER PUBLICATIONS

"A New Capability of Cadceus Supporting Knowledge-based Design", Sekido, Miyachi, and Kato, in Unisys Technology Review No. 79, Nov. 2003, pp. 15-26.

"Proposition of Product Behavior and Topology Design Process Model for Reliability Design System", Aoyama, Koga, and Kinoshita, Nihon Kikai Gakkai Sekkei Kogaku, vol. $13^{th}$, pp. 1-4.

* cited by examiner

*Primary Examiner* — Charles Kasenge
(74) *Attorney, Agent, or Firm* — Antonelli, Terry, Stout & Kraus, LLP.

(57) ABSTRACT

A design change range determining apparatus assigns a link between the one and another elements to generate link information table regarding the assigned link, and when the element is specified through an input unit, retrieves link information table to obtain the parent node associated with the specified element, obtains a child node associated with the parent node, and further obtains a child node which is a parent node of the obtain child node; and display the obtained parent nodes and child nodes on a display.

22 Claims, 11 Drawing Sheets

31 LINK INFORMATION TABLE

| LINK ID | LINK TYPE | PARENT NODE ID | FLAG | CHILD NODE ID | FLAG | LINK STRENGTH | ATTRIBUTE DATA |
|---|---|---|---|---|---|---|---|
| ... | ... | ... | | ... | | ... | |
| LINK ID | SHAPE ELEMENT-SHAPE ELEMENT | SHAPE ELEMENT ID | | SHAPE ELEMENT ID | | LINK STRENGTH | |
| ... | ... | ... | | ... | | ... | |
| LINK ID | PART-PART | PARENT PART ID | | CHILDE PART ID | | LINK STRENGTH | ATTRIBUTE DATA |
| ... | ... | ... | | ... | | ... | |
| LINK ID | UPPER LAYER FUNCTION-LOWER LAYER | FUNCTION ID | | FUNCTION ID | | LINK STRENGTH | ATTRIBUTE DATA |
| ... | ... | ... | | ... | | ... | |
| LINK ID | INPUT DATA TYPE-ANALYZING PROGRAM | INPUT DATA TYPE ID | | ANALYZING PROGRAM ID | | LINK STRENGTH | |
| ... | ... | ... | | ... | | ... | |
| LINK ID | ANALYZING PROGRAM-OUTPUT DATA TYPE | ANALYZING PROGRAM ID | | OUTPUT DATA TYPE ID | | LINK STRENGTH | |
| ... | ... | ... | | ... | | ... | |
| LINK ID | PART-FUNCTION | PART ID | | FUNCTION ID | | LINK STRENGTH | |
| ... | ... | ... | | ... | | ... | |
| LINK ID | INPUT DATA TYPE-FUNCTION | INPUT DATA ID | | FUNCTION ID | | LINK STRENGTH | |
| ... | ... | ... | | ... | | ... | |
| LINK ID | PART-SHAPE ELEMENT | PART ID | | SHAPE ELEMENT ID | | LINK STRENGTH | |
| ... | ... | ... | | ... | | ... | |
| LINK ID | FUNCTION-ANALYZING PROGRAM | FUNCTION ID | | ANALYZING PROGRAM ID | | LINK STRENGTH | |
| ... | ... | ... | | ... | | ... | |

FIG. 3B

32 ELEMENT ID ASSOCIATION LIST

| ELEMENT NAME | ELEMENT ID |
|---|---|
| SHAPE ELEMENT NAME | G001 |
| ⋮ | ⋮ |
| PART NAME | P001 |
| ⋮ | ⋮ |
| ANALYZING PROGRAM NAME | PR001 |
| ⋮ | ⋮ |
| INPUT DATA TYPE NAME | I001 |
| ⋮ | ⋮ |
| OUTPUT DATA TYPE NAME | O001 |
| ⋮ | ⋮ |
| FUNCTION NAME | F001 |
| ⋮ | ⋮ |

METHOD OF DETERMINING RANGE OF CHANGE IN DESIGN, DESIGN CHANGE RANGE DETERMINING APPARATUS, AND DESIGN CHANGE RANGE DETERMINING SYSTEM

CROSS REFERENCE TO RELATED APPLICATIONS

The present application claims benefit of the filing date of Japanese patent application No. 2006-260656 filed on Sep. 26, 2006, which is incorporated herein by reference.

FIELD OF THE INVENTION

The present invention relates to a method of determining a range of a change in design, a design change range determining apparatus, and a design change range determining system, and particularly to a method of determining a range of a change in design, a design change range determining apparatus, and a design change range determining system, for aiding product design using a computer, and the internet.

DESCRIPTION OF THE RELATED ART

In design and production of industrial products, a PDM (product Data Management) system for integrally managing various engineering data ranging from a conception design stage to a production stage, is known as a system for integrally managing product information with a computer. In the PDM system, generally, a BOM (Bill Of Material) which is a part list having a hierarchical structure is used as a system for arranging data. The BOM is a part list having the hierarchical structure for forming products and assemblies (sub-assembly) in which a node in each part layer is generally linked with data files such as related information necessary for developing a product (specifications, drawings, CAD (Computer Aided Design)).

JP5-12354A discloses a method of cooperation type design control. In the method, speedily determining production specifications is made in a trial stage by speedily performing the associative correction of all relative design parameters accompanying local design parameter alteration and grasping a secondary effect, and relaxing and reviewing design restrictions cooperatively.

Data inputted on a keyboard while stored in a main storage device are displayed on a display device by a central processing unit and the data on the main storage device are stored on a disk device by the central processing unit through a multi-bus and a disk controller, thus passing and receiving and transferring the data. Software consists of a data input part, an output part, a design parameter control part, a set restriction registration part, a program registration part, a design consistency control part, and a restriction relaxation and adjustment part. Then the associative correction of all the design parameter accompanying the local design parameter alteration and the grasping of the secondary effect are speeded up and unless a design solution is found, the design restrictions are relaxed and reviewed cooperatively among plural sections.

Further "A New Capability of CADCEUS Supporting Knowledge-based. Design", Sekido, Miyati, and Kato, in UNISYS TECHNOLOGY REVIEW No. 79, November 2003, discloses a system in which when a designer changes a specification value in a list, associated dimensional values are automatically changed by design parameters associated with a three-dimensional CAD by cooperating design parameters with a three-dimensional CAD model.

In an engineering data base, data is managed with a smaller unit than the PDM system. For example, in addition to the engineering database, there are a technology in which a plurality of databases are cooperatively operated, and an EAI (Enterprise Application Integration), in which data in a database A is previously associated with (mapping) data in a database B to cooperatively operate an application system managed in the database A with an application system managed in the database B.

Further, a document of "Proposition of Product Behavior and Topology Design Process Model for Reliability Design System" (<URL:http://www.msel.t.u-tokyo.ac.jp/~tsuyoshi-koga/B5.pdf>) discloses a technology in which a plurality of design parameters regarding a product development such as members in a product such as parts, and their attribute, and activities (tasks) can be shown by linking over design parameters.

SUMMARY OF THE INVENTION

A first aspect of the present invention provides a computer-implemented method of determining a range of influence due to a change of a design parameter of an element in a design data including a plurality of elements stored in a storage, wherein the design data including information of relation between the elements, wherein the design data includes information of relation between the elements, the method comprising the steps of: collecting the design data in the storage; associating one element with another element as either of a parent node or a child node on the basis of the obtained information of the relation between the elements in the design data to have a network structure to assign a link between the one and another elements to generate link information regarding the assigned link, storing the link information in the storage; and when the element is specified through an input unit, retrieving link information in the storage to obtain the parent node corresponding to the specified element, obtaining a child node associated with the parent nodes further obtaining a child node which is a parent node of the obtain child node; and displaying the obtained parent nodes and child nodes on a display.

A second aspect of the present invention provides a design change range determining apparatus for determining a range of influence due to a change of a design parameter of an element in design data, stored in a storage, including a plurality of elements, the apparatus comprising: a link information collecting unit for collecting the design data in the storage, wherein the design data including information of a relation between the elements; an inter-link element relation generating unit for associating one element with another element as either a parent node or a child node on the basis of the obtained information of the relation between elements in the design data to have a network structure to assign a link between the one and another elements to generate link information regarding the assigned link, storing the link information in the storage; and a change range determining unit for, when the element is specified through an input unit, retrieving link information in the storage to obtain the parent node corresponding to the specified element, obtaining a child node associated with the parent node, further obtaining a child node which is a parent node of the obtain child node; and displaying the obtained parent nodes and child nodes on a display.

A third aspect of the present invention provides a design change range determining system comprising: a design change range determining server for determining a range of influence due to a change of a design parameter of an element in design data, stored in a storage, including a plurality of elements; and a client for transmitting data of an element of which design parameter is changed, wherein the design data includes information of relation between the elements; and wherein the design change range determining server: collects the design data in the storage, the design data including information of relation between the elements; associates one element with another element as either a parent node or a child node on the basis of the obtained information of the relation between elements in the design data to have a network structure to assign a link between the one and another elements to generate link information regarding the assigned link; stores the link information in the storage; when the element is specified through an input unit, retrieves link information in the storage to obtain the parent node corresponding to the specified element, obtains a child node associated with the parent node, and further obtains a child node which is a parent node of the obtain child node; and displays the obtained parent nodes and child nodes on a display.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Prior to describing an embodiment of the present invention, the above-mentioned related art will be further argued.

In a method of managing product information according to the conventional PDM system mentioned above, because a relation between design parameters of parts are not included in data, when a change in design parameter of one part is made, a user cannot know a range of other parts influenced by the change. Further, in the technology according to JP5-12354A, it is necessary to generate data for each product in advance. This is not a general-use system.

In consideration of the circumstance mentioned above, the present invention provides a method of determining a design change range, a design change range determining apparatus, and a design change range determining system capable of, when a change is made for one part in design parameter, determining a range of other parts influenced by the change without previously preparing data for each product.

FIRST EMBODIMENT

With reference to drawings will be described a first embodiment.

[Structure]

Figure 1:
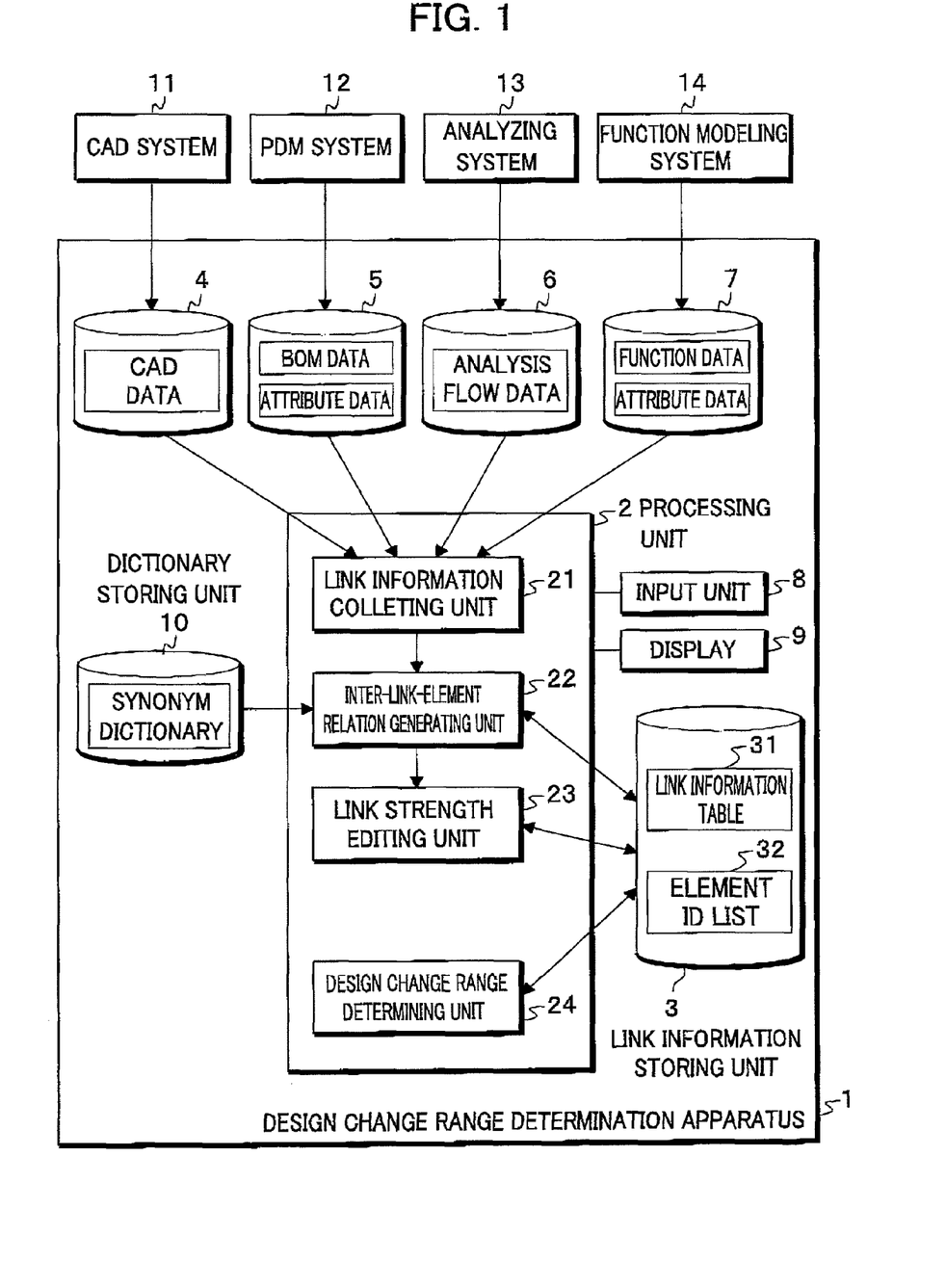
FIG. 1 is a block diagram of a design change range determining apparatus according to a first embodiment.

FIG. 1 is a block diagram of an example of a design change range determining apparatus according to the first embodiment.

The design change range determining apparatus 1 includes a processing unit 2, a link information storing unit 3, a CAD data storing unit 4, a BOM data storing unit 5, an analysis flow data storing unit 6, a function data storing unit 7, an input unit 8, a display 9, and a dictionary storing unit 10

Figure 3A:
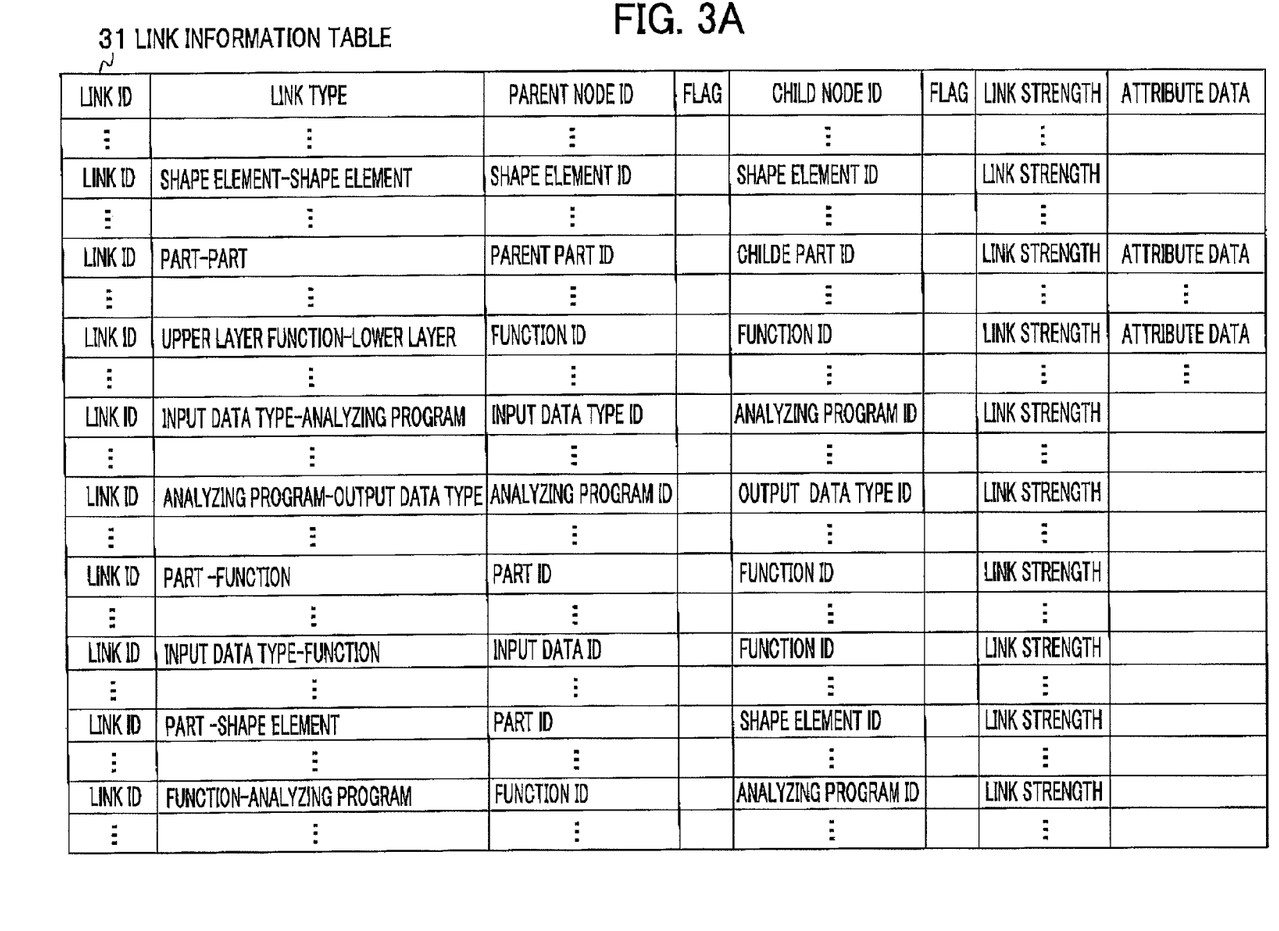
FIG. 3A is an example of a link information table according to the first embodiment.
Figure 3B:
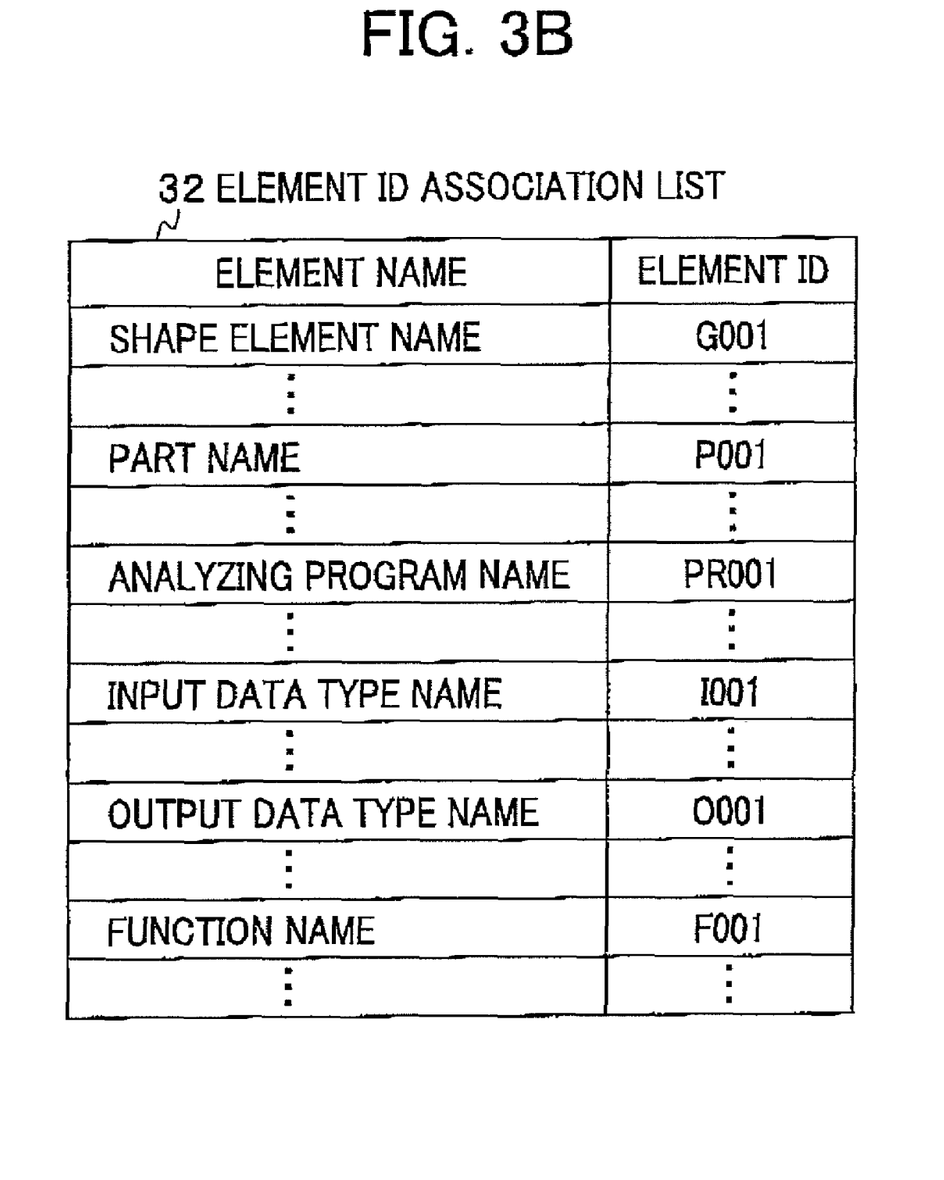
FIG. 3B is an element ID association list according to the first embodiment.

A processing unit 2 functions for effecting a link information table generating process, a link information table editing process, and a design change range determining process. The link information storing unit 3 includes a link information table 31, and an element ID corresponding list 32. These units will be mentioned in detail, later. Further, the link information table 31 and an element ID correspondence list 32 will be described later with reference to FIG. 3 The CAD data storing unit 4 stores CAD data generated by a CAD system 11. The BOM data storing unit 5 stores BOM data and attribute data of parts generated by a PDM system 12. The analysis flow data storing unit 6 stores analysis flow data 3 showing processes of analysis effected by an analyzing system 13, such as a simulator, for controlling execution of analyzing program groups. The function data storing unit 7 stores function data and attribute data generated by a function modeling system 14 which separates functions of a product to perform modeling (function modeling).

The dictionary storing unit 10 stores a synonym dictionary including information of synonyms.

The link information storing unit 3, the CAD data storing unit 4, the BOM data storing unit 5, the analysis flow data storing unit 6, and the function data storing unit 7, and the dictionary storing unit 10 are also referred to as storing units.

Here, the term "element" means elements forming each of data. For example, in a case of the CAD data, faces forming a product and parts are elements (shape element). In a case of the BOM data, parts or attributes are elements. In a case of the flow data, input values, the analyzing program, and an output value are elements. In a case of the function data, functions or attributes are elements.

Design data includes the CAD data, the BOM data, the attribute data of the BOM data, the analysis flow data, the function data, and the attribute data of the function data.

The function means functions that products or parts have. For example, a function of "motor" is "transforming an electric energy into a rotational energy. The function has attributes including "rated rotation speed" and "torque" for the function of transforming the electric energy into the rotational energy. Thus, the attribute data in the function data storing unit 7 stores attributes of such a function associated with the function.

The input unit 8 may be a keyboard and a mouse having a function for entering input information from a user in the processing unit 2. The display 9 has a function of displaying a result of design change range determining process performed by the processing unit 2.

Database

In the first embodiment, the design change range determining apparatus 1 includes all the link information storing unit 3, the CAD data storing unit 4, the BOM data storing unit 5, the analysis flow data storing unit 6, and a function data storing unit 7, and the link information storing unit 3. However, the present invention is not limited to this. For example, at least one of the link information storing unit 3, the CAD data storing unit 4, the BOM data storing unit 5, the analysis flow data storing unit 6, the function data storing unit 7, and the dictionary storing unit 10 is changed to a database (DB) to include the functions of other storing units outside the design change range determining apparatus 1.

The processing unit 2 includes a link information collecting unit 21, an inter-link element-relation generating unit 22, a link strength editing unit 23, and a design change range determining unit 24.

The link information collecting unit 21 has a function of obtaining (collecting) data from the CAD data storing unit 4, the BOM data storing unit 5, the analysis flow data storing unit 6, and the function data storing unit 7 and sending the data to the inter-link-element relation generating unit 22. The inter-link-element relation generating unit 22 has a function of generating an element ID association list 32 and generating a link information table 31. The link strength editing unit 23 has a function of performing a link information table editing mentioned later with reference to FIG. 6. The design change range determining unit 24 has a function of performing a design change range determining process mentioned later with reference to FIG. 8.

[Example of Determination Result Display Image]

Figure 2:
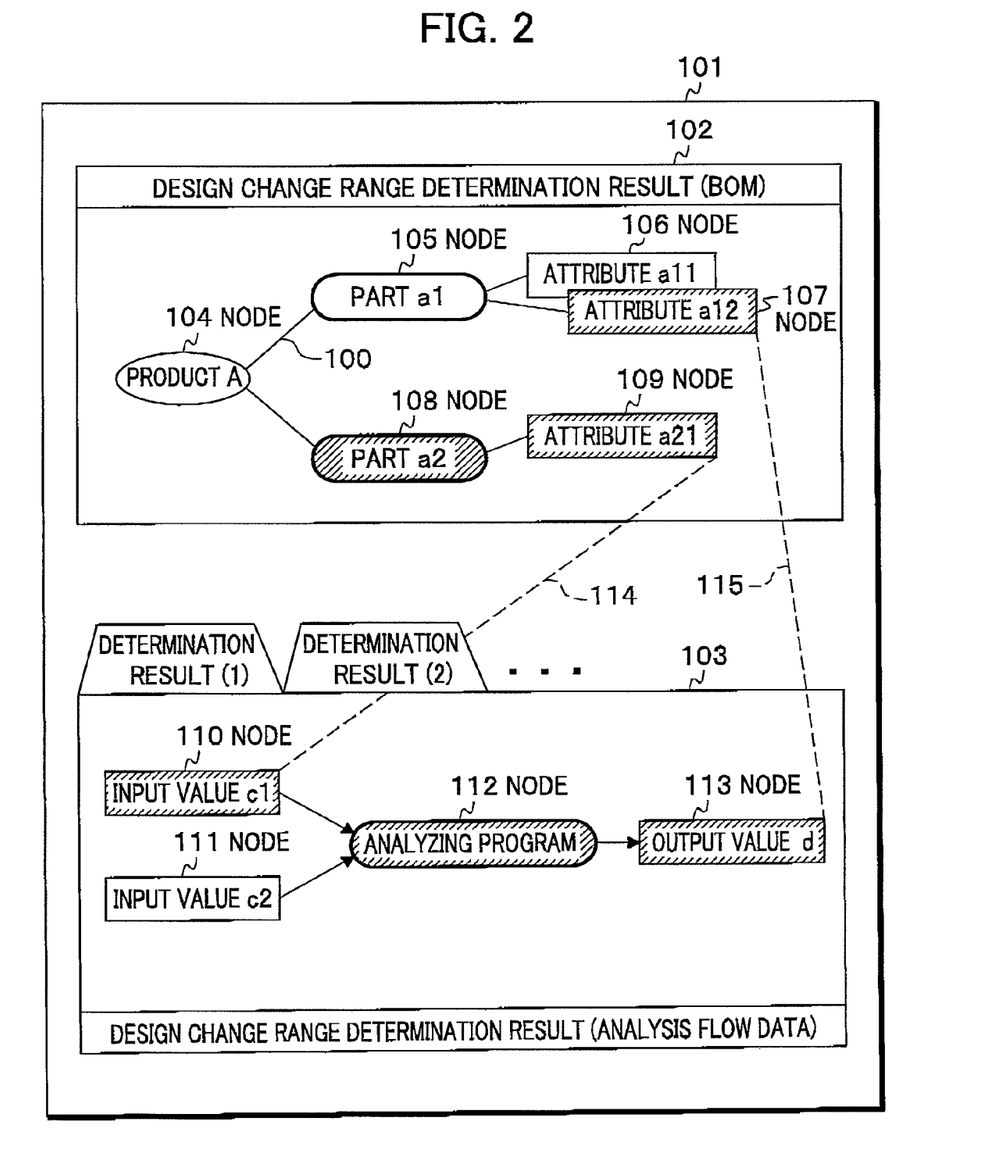
FIG. 2 illustrates an example of a screen image showing a design change range determination result according to the first embodiment.

FIG. 2 is an illustration of an example of a screen image for showing a design change range determination result according to the first embodiment.

Displayed on the screen image 101 shown in FIG. 2 are an area 102 displaying a design change range determination result of the BOM and an area 103 displaying a design change rage determination result of the analysis flow data.

Further, nodes 104 to 113 are shown on the screen image 101. Each node indicates a name of an associated element. Between each pair of nodes are connected with a link 100 to show a network structure. A node shown more leftward in FIG. 2 is a parent node and a node shown more rightward than the parent node is a child node. For example, a node 105 is a child node of the node 104 as well as a parent node of the nodes 106 and 107 in the network structure.

In the area 102, information regarding a product A (node 104) is displayed. Displayed as a child node of the product A are the node 105 which is a part a1 forming the product A and a node 108 which is a part a2. Each part is assigned with attributes and thus, an attribute "all" and an attribute a12 are indicated as nodes 106 and 107, respectively. Similarly, a node 109 is displayed as an attribute of a part a2.

In the area 103, an analysis flow data regarding the attributes a21 and a12 are displayed.

In this example, an input values c1 and c2 for an analyzing program such as a simulator are displayed as parent nodes 110 and 111 for an analyzing program. As a result of entering these input values in the analyzing program, an output value d is displayed as a child node 113 of the analyzing program.

In this example, when a user specifies the part a2 as a target of change by clicking, or the like of the node 108, a range subject to an influence of change in a design parameter of the part a2 is determined through retrieving, and the result is displayed as hatched parts, i.e., the nodes 107 to 113 except 111. The chain line 114 denotes a link indicating that the value of the attribute a21 can influence the input value c1, and a chain line 115 denotes a link indicating that the value of the attribute a12 can influence the output value d.

The area 103 in FIG. 2 shows a case where there are a plurality of search results (determination results) in design change which are displayed as tags for changing display images which are arranged in order of link strength between the attribute and an input value

[Example of Link Information]

FIGS. 3A and 3B show an example of data stored in the link information storing unit 3 in which FIG. 3A shows a link information table 31, and FIG. 3B shows an element ID association list 32.

As shown in FIG. 3A, the link information table 31 includes fields of a link ID: a link type; a parent node ID, a flag, a child node ID, a flag; a link strength; and attribute data.

The link ID is an identification uniquely assigned to a link. The link type indicates a type of the corresponding link. The parent node ID stores an element ID corresponding to the parent node. The child node ID stores an element ID of the element corresponding to the child node. The parent node ID and the child node ID are provided with flags. If each of the nodes is searched as a result of the design change range determination process, a flag is set. The field of the link strength stores a value of link strength of the corresponding link. The field of the attribute data stores an attribute of the part and function.

As shown in FIG. 3B, the element ID association list 32 stores element names and element IDs respectively associated to the element names.

Figure 4:
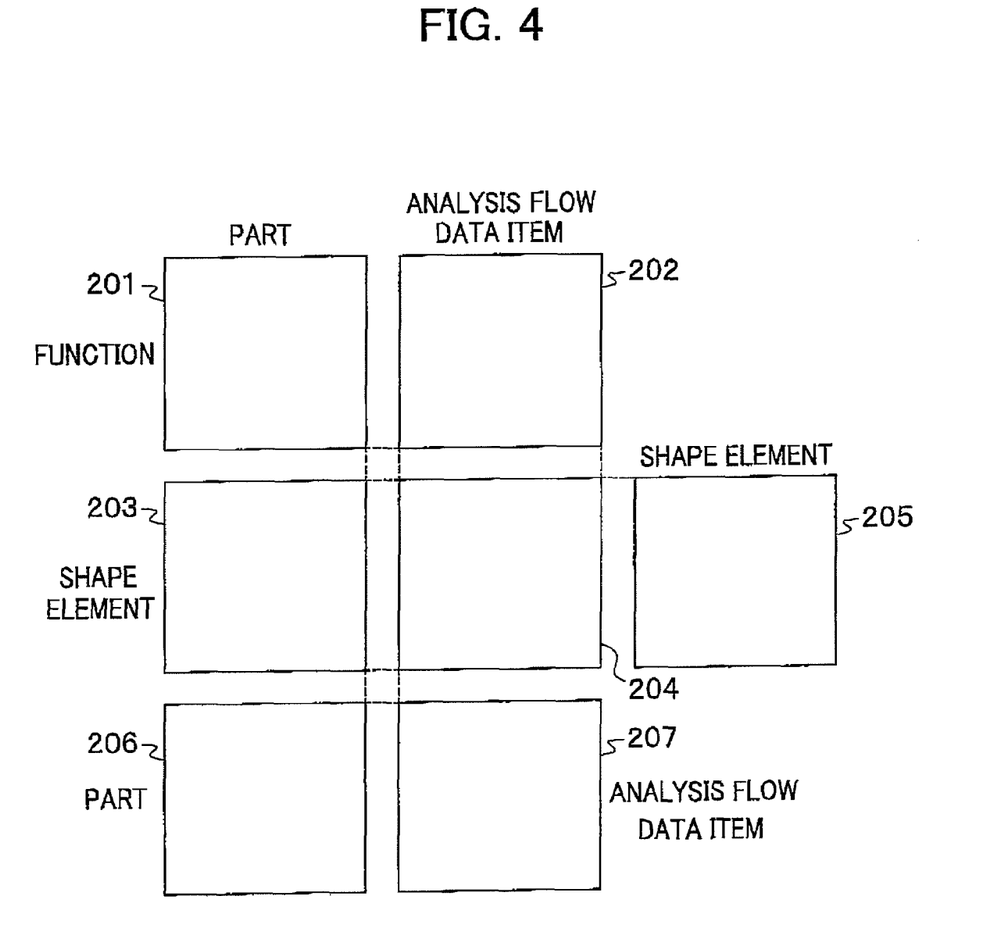
FIG. 4 is another example of the link information table according to the first embodiment.

FIG. 4 shows another example of the link information table shown in FIG. 3A.

In FIG. 3A, the associations between elements (link relation) are shown in a table. However, as shown in FIG. 4, an individual table may be generated for each association between elements Tables 201 to 207 in FIG. 4 each show link relations between associated elements.

The table 201 is a table in which functions are associated with parts. Similarly, the table 202 is a table in which the functions are associated with analysis data flow items. The table 203 is a table in which shape elements are associated with the parts. The table 204 is a table in which the shape elements are associated with analysis data flow items. The table 205 is a table in which the shape elements are associated with the shape elements. The table 206 is a table in which the parts are associated with the parts. The table 207 is a table in which the parts are associated with the analysis flow data items.

In these tables, data such as the link ID, the flag, the link strength, and the attribute are stored in a form in which the data are associated with the parent node and child node. In each table, each row indicates a corresponding element ID, and each line indicates a corresponding element ID. For example, in the table 201 in which functions are associated with parts, a line indicates element IDs of the parts and a row indicates elements ID of functions. Here, the analysis flow data item includes an input data type, an analyzing program name, and an output data type.

[Link Information Table Generating Process]

With reference to FIGS. 1, 3A, and 3B and using FIGS. 5 to 8 will be described each process performed by the design change range determination apparatus 1.

Figure 5:
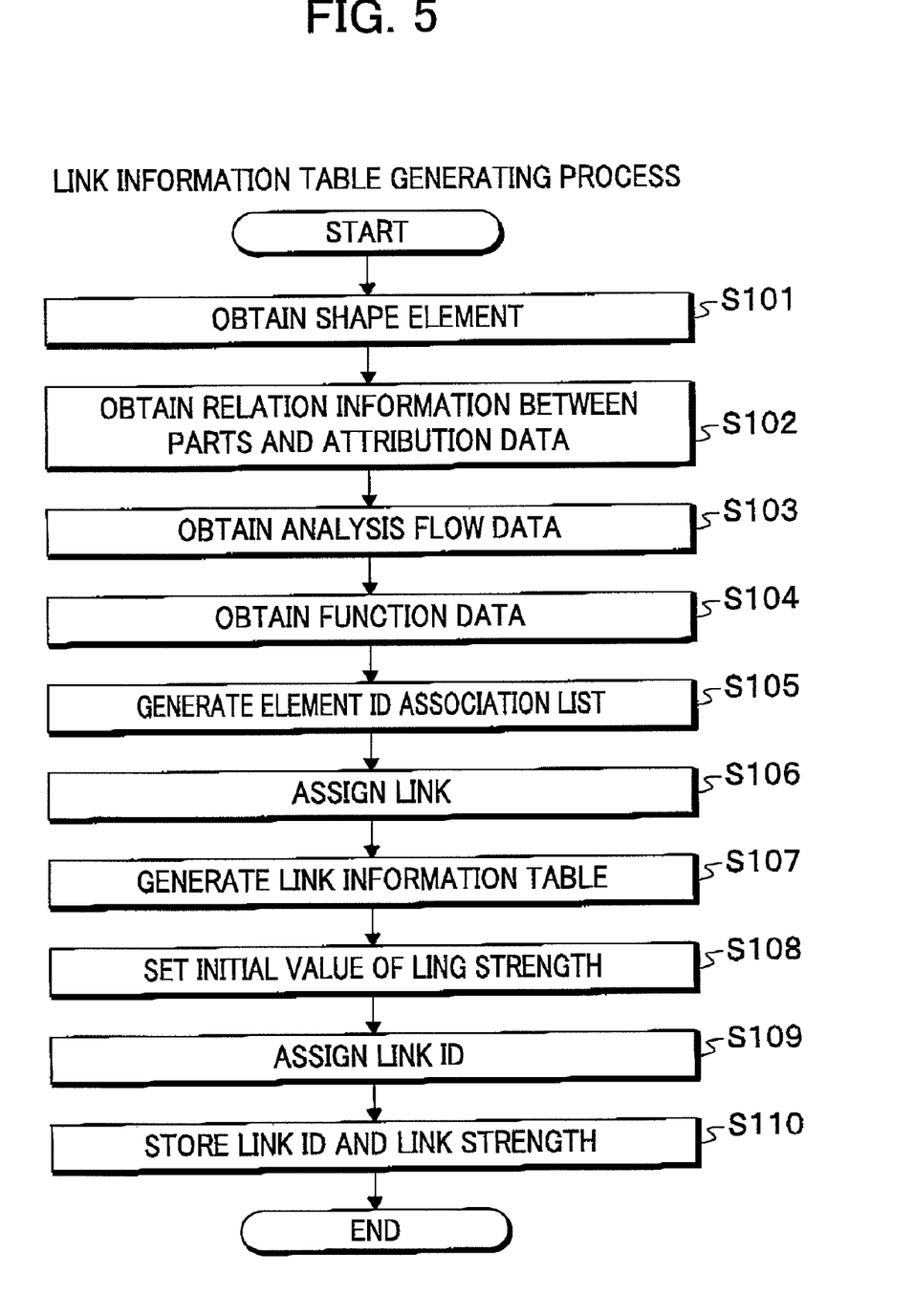
FIG. 5 depicts a flowchart showing a flow of a link information table generating process according to the first embodiment.

FIG. 5 is a flow chart illustrating a flow of the link information table generating process according to the first embodiment.

Before a process of design assisting according to the embodiment, the following process is executed.

First, the CAD data generated by the CAD system 11 is stored in the CAD data storing unit 4. Further, the BOM data generated by the PDM system 12 is stored in the BOM data storing unit 5. The analysis result analyzed by the analyzing system 13 is stored in the analysis flow data storing unit 6. Further, the function data generated by the function modeling system 14 is stored in the function data storing unit 7.

Next, processes in steps S101 to S110 shown in FIG. 5 are executed by the link information collecting unit 21 to generate the link information table 31 which is stored in the link information storing unit 3. The processes from the step S101 to S110 are periodically executed, for example, once a day.

For example, the link information collecting unit 21 collects data of the shape element of each part from the CAD data storing unit 4 (S101).

Further, the link information collecting unit 21 obtains relation information between the parts in the BOM data and attribute data of the parts from the BOM data storing unit 5 (S102).

Further, the link information collecting unit 21 obtains the analysis flow data from the analysis flow data storing unit 6 (S103).

Next, the link information collecting unit 21 obtains the function data from the function data storing unit 7 (S104).

The processes from the step S101 to the step S104 can be executed irrespective of order therebetween. Further, in a desired analysis, there may be a case where not all data obtained in the steps S101 to S104 are necessary. In such a case, not all processes from the steps S101 to S104 are necessary, but it is enough to execute at least two processes.

Next, the inter-link-element relation generating unit 22 assigns an ID for each element in the data obtained in the steps S101 to S104 to generate the element ID association list 32 (S105) to store it in the link information storing unit 3.

The inter-link-element relation generating unit 22 assigns a link between data obtained from the steps S101 to S104 (S106), generates the link information table 31 (S107), and stores the generated link information table 31 in the information storing unit 3.

For example, the link is assigned as follows:

The inter-link-element relation generating unit 22 assigns an element ID to the link between a part and another part with reference to the BOM data by associating a parent node with a child node in the link information table 31. The inter-link-element relation generating unit 22 assigns element IDs to an element link between a function and another function with reference to the function data. Similarly, the inter-link-element relation generating unit 22 assigns element IDs to a link between the analysis data item (the input data type, the analyzing program, and output data type) and the analysis data item with reference to the analysis flow data. The inter-link-element relation generating unit 22 assigns element IDs to a link between a shape element and another shape element (dimension restriction) with reference to the CAD data.

With links other than the links mentioned above, for example, links between different types of elements such as a link between a part and a function, the inter-link-element relation generation unit 22 assigns the link between the part and the function by searching the function data for functions including functions having similar names with a synonym dictionary.

Next, the inter-link-element relation generating unit 22 sets a link strength across the link under assignment as an initial value on the basis of a rule predetermined regarding the link under assignment (S108). The predetermined rule is, for example, as follows:

For example, if a link is between the same type of elements such as a link between parts, the link strength is set to a maximum value (for example, 1.0) as an initial value. If a link is between different types of elements such as a link between a part and a function, the link strength is set to an intermediate value lower than the maximum value (for example, 0.5) as an initial value. Further, there may be a predetermined rule so as to change the initial value of the link strength for each link type such that the link strength is changed, for example, in accordance with whether the part name is identical with a part name in the function perfectly or partially.

The inter-link element relation generating unit 22 assigns in a step S109, a link ID to the link assigned to associated elements in the step S106 and stores the link ID and the link strength in the link information table 31 in the link information storing unit 3 (S110).

[Link Information Table Editing Process]

Figure 6:
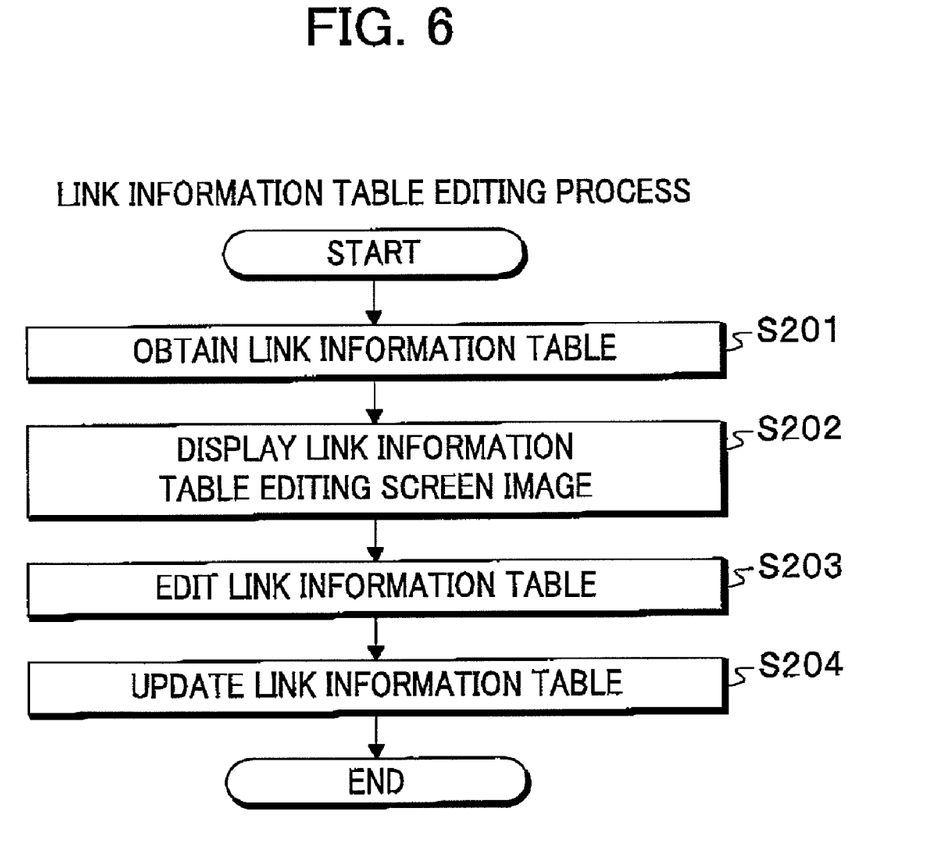
FIG. 6 depicts a flowchart showing a flow of a link information table editing process according to the first embodiment.

FIG. 6 depicts a flowchart of the link information table editing process according to the first embodiment.

The link strength editing unit 23 reads the link information table 31 (S201) and displays a link information table editing image prepared on the basis of the read link information table 31 (S202).

Next, a manager edits the link information table 31 by entering a link strength with the input unit 8 (S203). The link information table editing screen image and editing of the link information table 31 will be described later with reference to FIG. 7.

Next, the editing result in the step S203 is stored in the link information storing unit 3 as a new link information table 31 to update the link information table 31 (S204).

In this storing operation, the editing result may be written over the present link information table 31, or independently stored as another version with the present link information table 31 left

[Example of Link Information Table Editing Image]

Figure 7:
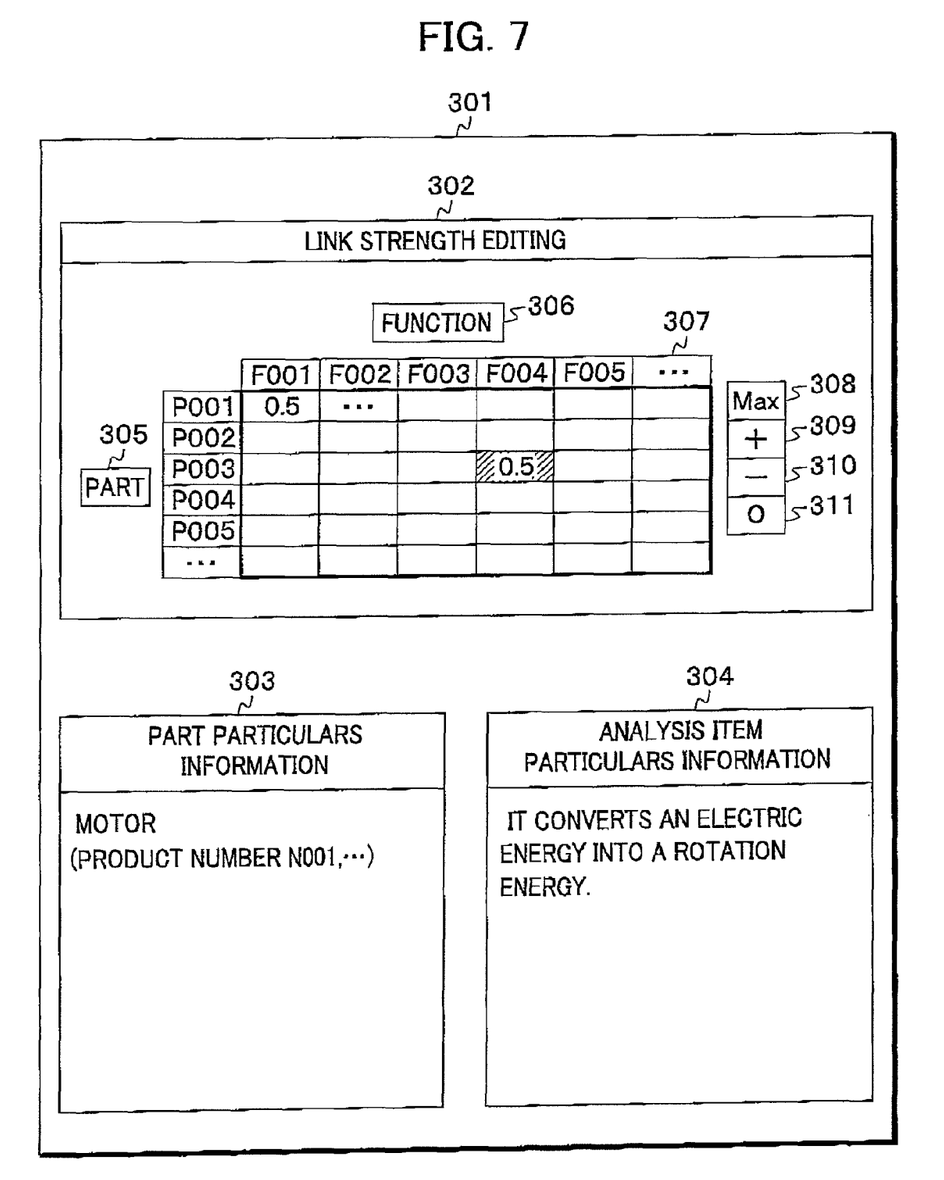
FIG. 7 illustrates an example of a screen image for editing a link information table according to the first embodiment.

FIG. 7 shows an example of the link information table editing screen image.

In FIG. 7, on the screen image 301, there are shown a link strength editing area 302, and areas 303 and 304 for displaying particulars information of two linked elements.

The manager selects names for design parameters which the manager desires to edit using the boxes 305 and 306 in the area 302. In the example in FIG. 7, "Part" and "Function" are selected.

After selecting the names using the boxes 305 and 306, a corresponding link strength in the link information table 31 is displayed as a relation matrix 307. The relation matrix 307 is displayed in such a form that one element ID is associated with another element ID. In the example shown in FIG. 7, the relation matrix 307 is displayed in a form that element IDs of parts are associated with element IDs of the functions.

Next, the manager selects a pair of elements of which link strength is to be changed and changes a value of the link strength with buttons 308 to 311 on the right of the area 302. Here, a button 308 is provided for changing the link strength to a maximum value (for example, 1.0), a button 309 is provided for increasing the value of the link strength (for example, a step of 0.1), a button 310 is provided for decreasing the value of the link strength (for example, a step of 0.1), and a button 311 is provided for changing the value of the link strength to zero. As another method of changing the value of the link strength, the manager can directly enter the value of the link strength on the relation matrix 307.

The areas 303 and 304 are provided for displaying particular information of the elements associated with the selected link strength. In the example shown in FIG. 7, the link strength is selected for the element ID of the parts which is P003 and the element ID of the functions which is F004, particular information of the part (motor (product number or the like) having the element ID of P003 is displayed in the area 303 and particular information of P004(it converts an electric energy into a rotation energy) is displayed in the area 304.

[Design Change Range Determining Process]

Figure 8:
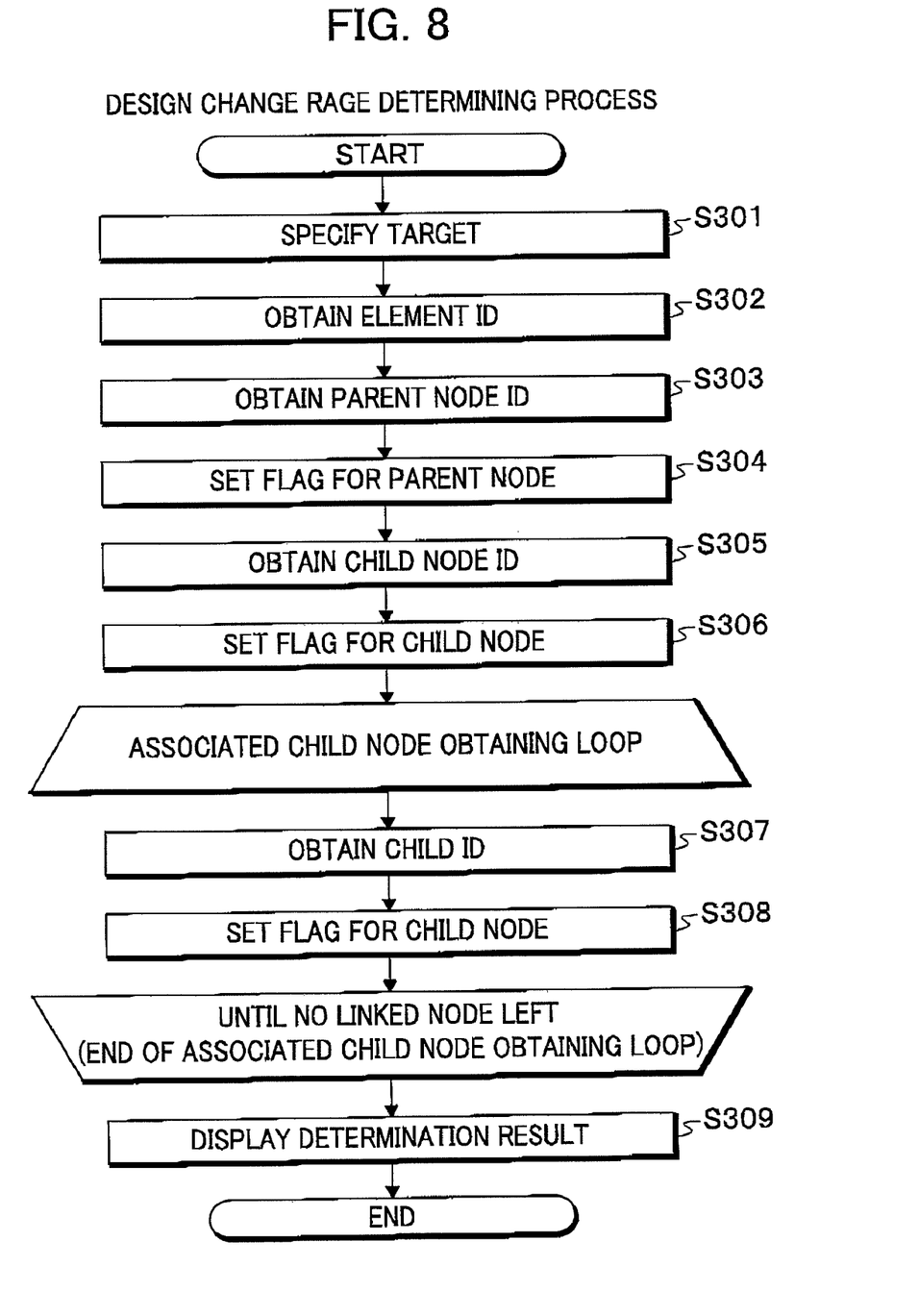
FIG. 8 depicts a flowchart for showing a flow of a design change range determining process according to the first embodiment.

FIG. 8 depicts a flowchart of the design change range determining process according to the first embodiment.

In FIG. 8, a user specifies a target of design change (S301.) More specifically, the user enters a name of a part of which design parameter is to be changed, an element ID, a function, a function element ID or the like of the part are entered with the input unit 8. A function name such as "Rotating Function" is generally entered for the function. However, a natural sentence such as "An electric energy is converted into a rotation energy." may be entered. In this case, the function is identified with a natural sentence determination. Further, a type name of the input data or an element ID of the input data type are specified, and an input value of input data to be changed may be entered. If the input value is entered in this status, the following process will be executed. The change range determining unit 24 transmits the entered input value to the analyzing system 13. The analyzing system 13 calculates an output value on the basis of the transmitted input value and transmits the calculated output value to the change range determining unit 24. The change range determining unit 24 displays the transmitted output value on the display 9.

Next, the information entered in the step S301 is a part name or a function name, the change range determining unit 24 obtains element IDs such as an element ID of the corresponding part or an element ID of the corresponding function with reference to the element ID association list 32 (S302).

Next, if the change range determining unit 24 searches the link information table 31 for a parent node having the entered or obtained element ID to obtain the corresponding parent node ID (S303).

The change range determining unit 24 searches the link information table 31 to determine an element ID of a child node ID having an element ID of these parts or an element ID of the function as the parent node ID (S105). Next, the change range determining unit 24 sets a flag for the child node (S306), and then, enters an associated node obtaining loop (S307 and S308).

Next, the change range determining unit 24 searches the link information table 31 with the obtained child node ID as a key to obtain a child node ID having the obtained child node ID as a parent node ID (S307) and sets a flag for the obtained child node ID. Next, the change range determining unit 24 repeats the processes from the step S307 to the step S308 until there is no linked node left. When there is no linked node left, the change range determining unit 24 finishes the associated child node obtaining loop and proceeds to a step S309.

Next, the change range determining unit 24 displays the result of the step S302, a node of which flag is set, links, and the corresponding attribute data as a determination result as shown in FIG. 2.

Further, as needed, the change range determining unit 24 may display on the display 9 an actual content corresponding to the node of the design parameter obtained as the determination result of the step S304. Here, the content means the CAD data, the BOM data, the analysis flow data, and the function data. For example, if the content is the CAD data, in the CAD system 11, the corresponding shape element is displayed with emphasis.

Further, in the first embodiment, because the attribute of the link can be handled as the link type and a link strength, an influenced range of a design change can be restricted upon determination by previously specifying a link type or a threshold value for the links strength.

SECOND EMBODIMENT

Figure 9:
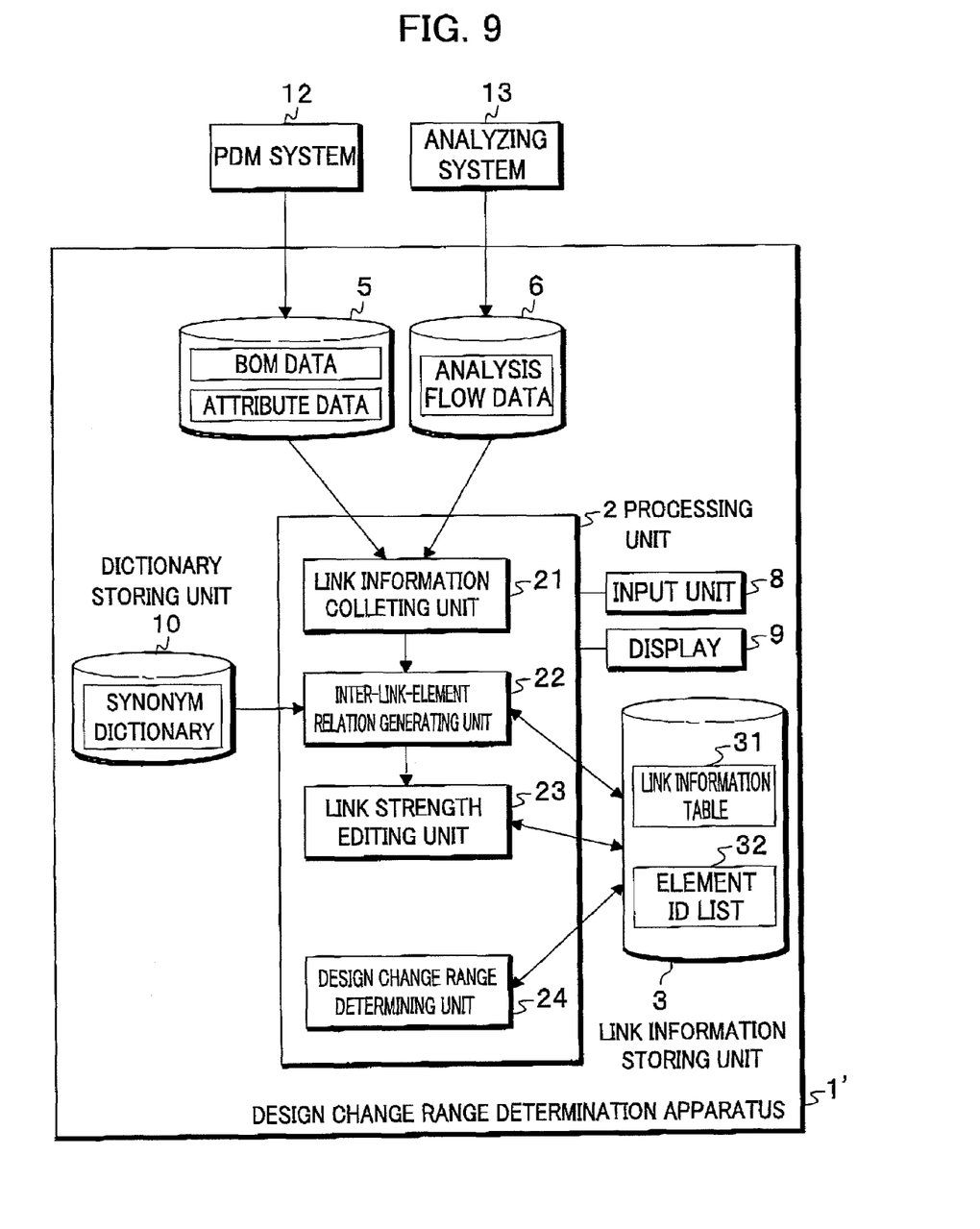
FIG. 9 is a block diagram of a design change range determining apparatus according to a second embodiment.

FIG. 9 is a block diagram of the design change range determining apparatus according to a second embodiment of the present invention. The same elements as shown in FIG. 1 are designated with the same reference and thus, a duplicated explanation will be omitted.

The design change determining apparatus 1' is substantially the same as that of the first embodiment. Difference is in that the CAT) data and the function data are omitted from FIG. 1.

This is because the design change range determining process is possible in the presence of the BOM data and the analysis flow data at least, the CAD data and the function data are excluded to form a minimum scale of the design change range determining apparatus 1'

[Example of System Structure]

Figure 10:
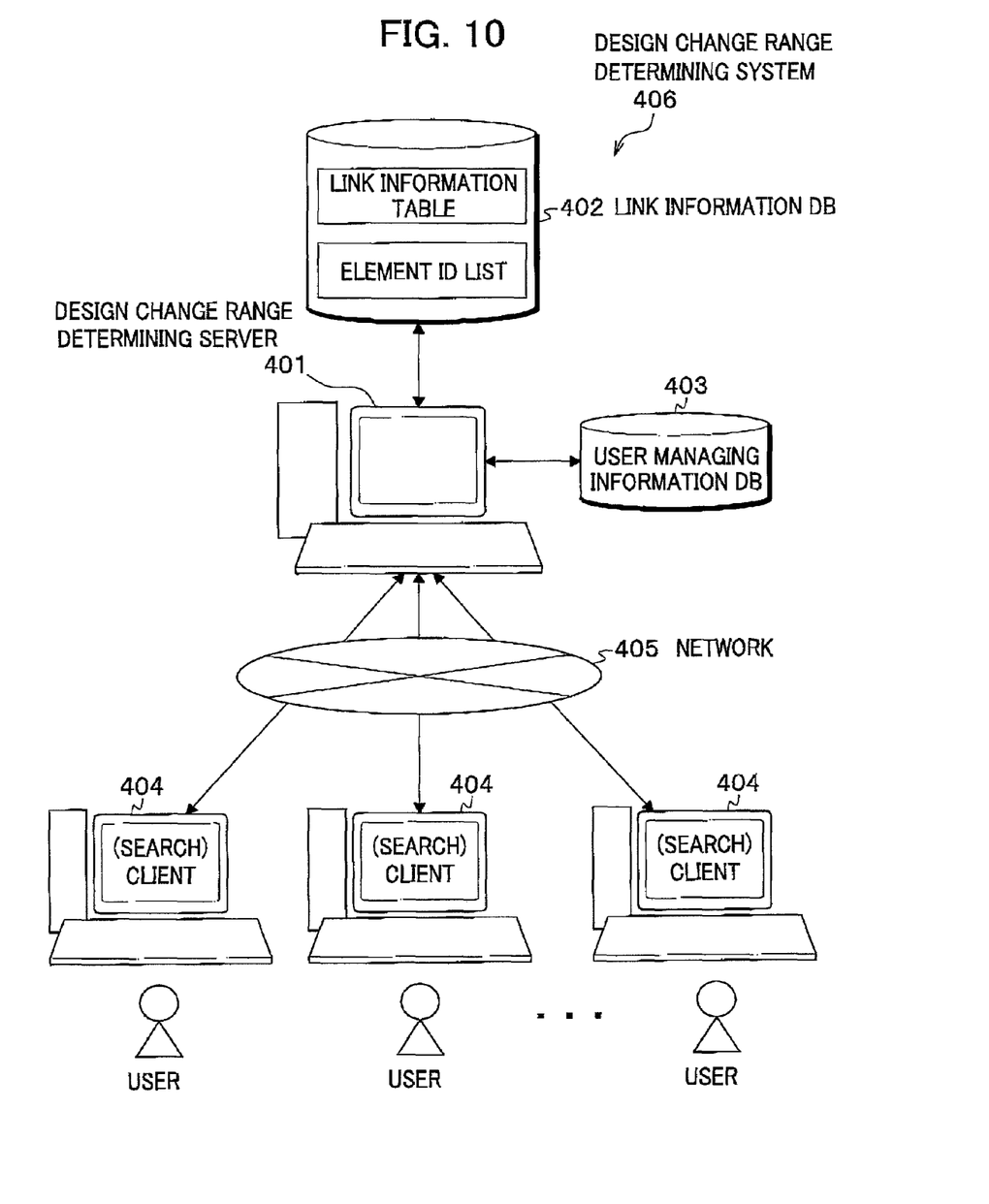
FIG. 10 is a block diagram of a design change range determining system according to the first and second embodiments.

FIG. 10 shows an example of a design change range determining system according to the second embodiment.

The design change range determining system 406 includes a design change range determining server 401, a link information DB (database) 402, a use managing information DB 403, and clients 404.

The design change range determining server 401 corresponds to the design change range determining apparatuses 1 and 1' and has functions of the link information table generating process shown in FIG. 5, the link information table editing process, and the design change range determining process shown in FIG. 8. The link information DB 402 is identical with the link information storing unit 3 shown in FIGS. 1 and 9 and connected to the design change rang determining server 401 through a LAN (Local Area Network) or the like. The user managing information DB 403 is connected to the design change range determining server 401 through the LAN or the like and stores information regarding the user using the client 404 (account name, password, or the like). The client 404 is connected to the design change range determining server 401 through a network 405 such a WAN (Wide Area Network) and has functions of: instructing the link information table generating process shown in FIG. 5; instructing the link information table editing process shown in FIG. 6; entering information in the design change range determining server to edit the link strength; instructing the design change range determining process shown in FIG. 8; and displaying results of these processes.

Further, in FIG. 10, the link information DB 402 and the user managing information DB 403 are separated from the design change range determining server 401. However, these units may be integrated.

Further, the client 404 may transmit the entered link information table 31, the element ID associated list 32, or the like to the design change range determining server 401 through the network 405 after the link information table 31, the element ID association list 32, or the like are entered through an input unit (not shown) of the client 404. The design change range determining server 401 may store the received link information table 31, the element ID association list 32, or the like in the link information DB 402.

In the example shown in FIG. 10, the link information DB 402 is installed outside the design change range determining server 401. However, the link information DB 402 may be installed inside the design change range determining server 401.

Further, in the example shown in FIG. 10, the design change range determining server 401 is provided using one computer. However, a plurality of design change range determining server 401 may be installed and coupled to each other through a LAN to conduct parallel processing of the link information table generating process, the link information table editing process shown in FIG. 6, and the design change rage determining process shown in FIG. 8.

According to the present invention, in a development of a product, a range influenced by the change in designing the product under development can be surely provided in a short time by collecting and managing the relation information between design parameters. Further, in view of the product data management and design knowledge management, a flexibility and expandability can be expected because various design assist systems can be handled.

The invention claimed is:

1. A computer-implemented method of searching with respect to an element in a design data including a plurality of elements stored in a storage, wherein the design data including information of relation between the elements, the method comprising:

collecting the design data in the storage;

associating one element with another element as either of a parent node or a child node, and one of the elements with an attribute of one of the elements as either of a parent node or a child node on the basis of the relation between the elements in the design data to have a network structure assigning links between the one and another elements, and between the one of the elements and the attribute of one of the elements to generate link information regarding the assigned link, storing the link information in the storage, setting an attribute of a link to each of the links in the link information; and when the element of which an attribute is to be changed is specified through an input unit, retrieving link information in the storage to obtain the parent node corresponding to the specified element, obtaining at least one of child nodes corresponding to the another element, and associated with the parent node, further obtaining a child node corresponding to the attribute of one of the elements; and displaying the parent node and the child node corresponding to the another element and the child node corresponding to the attribute of one of the elements on a display, so as to determine a range of influence due to a change of a design parameter of an element being narrowed down using the attribute of the link.

2. The method as claimed in claim 1, wherein the design data comprises at least two of CAD data, BOM data, analysis flow data, and function data.

3. The method as claimed in claim 1, wherein the attribute of the link is a link strength indicating a strength in relation between the elements for each link.

4. The method as claimed in claim 1, further comprising, when the parent node and child nodes are displayed on the display, displaying the parent node and the child nodes with emphasized displaying.

5. The method as claimed in claim 1, further comprising, when the parent node and child nodes are displayed on the display, displaying either of a link between the parent node and child node or a link between the child node and another child node.

6. The method as claimed in claim 1, wherein the attribute of the link is a link type indicating a type in relation between the elements for each link.

7. The method as claimed in claim 1, further comprising a database that stores a data for a synonym dictionary, searching function data for functions having similar names with the synonym dictionary.

8. A design change range determining apparatus for determining a range of influence due to a change of a design parameter of an element in design data, stored in a storage, including a plurality of elements, the apparatus is configured to effect operations of:

collecting the design data in the storage;

associating one element with another element as either of a parent node or a child node, and associating one of the elements with an attribute of one of the elements as either of a parent node or a child node on the basis of the relation between the elements in the design data, to define associations of the elements and attributes as a network structure;

assigning links between the one and another elements, and between the one of the elements and the attribute of one of the elements to generate link information, storing the link information in the storage, setting an attribute of a link to each of the links in the link information; and when the element of which an attribute is to be changed is specified through an input unit, retrieving link information in the storage to obtain the parent node corresponding to the specified element, obtaining at least one of child nodes corresponding to the another element, and associated with the parent node and further obtaining a child node corresponding to the attribute of one of the elements; and displaying the parent node and the child node corresponding to the another element and the child node corresponding to the attribute of one of the elements on a display, so as to determine a range of influence due to a change of a design parameter of an element being narrowed down using the attribute of the link.

9. The design change range determining apparatus as claimed in claim 8, wherein the design data comprises at least two of CAD data, BOM data, analysis flow data, and function data.

10. The design change range determining apparatus as claimed in claim 8, further comprising a link strength editing unit for setting a link strength indicating a strength in relation between the elements for each link in accordance with either a value entered through the input unit or a predetermined value.

11. The design change range determining apparatus as claimed in claim 8, wherein when the parent node and child nodes are displayed on the display, the change range determining unit displays the parent node and the child nodes with emphasized displaying.

12. The design change range determining apparatus as claimed in claim 8, wherein when the parent node and child nodes are displayed on the display, the change range determining unit displays either of a link between the parent node and child node or a link between the child node and another child node.

13. The design change range determining apparatus as claimed in claim 8, wherein the attribute of the link is a link type indicating a type in relation between the elements for each link.

14. The design change range determining apparatus as claimed in claim 8, further comprising a database that stores a data for a synonym dictionary, searching function data for functions having similar names with the synonym dictionary.

15. A design change range determining system comprising:
a design change range determining server for searching with respect to an element in design data, stored in a storage, including a plurality of elements; and
a client for transmitting data of an element of which design parameter is changed, wherein
the design change range determining server is configured to effect operations of:
collecting the design data in the storage;
associating one element with another element as either a parent node or a child node, and associating one of the elements with an attribute of one of the elements as either of a parent node or a child node on the basis of the relation between the elements in the design data, to define associations of the elements and attributes as a network structure;
assigning links between the one and another elements, and between the one of the elements and the attribute of one of the elements to generate link information, storing the link information in the storage, setting an attribute of a link to each of the links in the link information; and
when the element of which an attribute is to be changed is specified through an input unit, retrieving link information in the storage to obtain the parent node corresponding to the specified element,
obtaining at least one of child nodes corresponding to the another element, and associated with the parent node and further obtaining a child node corresponding to the attribute of one of the elements; and
displaying the parent node and the child node corresponding to the another element and the child node corresponding to the attribute of one of the elements on a display, so as to determine a range of influence due to a change of a design parameter of an element being narrowed down using the attribute of the link.

16. The system as claimed in claim 15, wherein the design data comprises at least two of CAD data, BOM data, analysis flow data, and function data.

17. The system as claimed in claim 15, wherein a link strength indicates a strength in relation between the elements for each link is set in accordance with either a value entered through the input unit or a predetermined value.

18. The system as claimed in claim 15, wherein when the parent node and child nodes are displayed on the display, the parent node and the child nodes are displayed with emphasized displaying.

19. The system as claimed in claim 15, wherein when the parent node and child nodes are displayed on the display, either of a link between the parent node and child node or a link between the child node and another child node is displayed.

20. The system as claimed in claim 15, wherein the attribute of the link is a link type indicating a type in relation between the elements for each link.

21. The system as claimed in claim 15, further comprising a database that stores a data for a synonym dictionary, searching function data for functions having similar names with the synonym dictionary.

22. A computer-implemented method of determining a range that a change of a design parameter of an element in a design data to manufacture a product affects other data components in the design data, the design data including a plurality of elements stored in a storage and including information of relation between the elements, where any attribute of the subject product or part thereof may be taken as a type of element, the method comprising:
collecting the design data in the storage;
associating respective elements and attributes, of the design data, with each other as either of a parent node or a child node, on the basis of the relation between the elements and attributes in the design data, to define associations of the elements and attributes as a network structure;
assigning links between pairs of the elements and attributes, of the design data, to generate link information, and storing the link information in the storage, and setting an attribute of a link to each of the links in the link information; and
when the element of which an attribute is to be changed is specified through an input unit, retrieving link information in the storage to obtain a parent node corresponding to the specified element, and obtain other child nodes and attributes associated from the specified element and from the parent node corresponding to the specified element; and
displaying the parent node, the specified node and the other child nodes and attributes, and highlighting ones of the specified node and the other child nodes and attributes affected by the attribute to be changed specified through the input unit, so as to display a range of influence in the design data due to a change of a design parameter of an element being narrowed down using the attribute of the link.

* * * * *